United States Patent

[11] 3,530,869

| [72] | Inventor | Carmine V. DiCamillo<br>Silver Spring, Maryland |
|---|---|---|
| [21] | Appl. No. | 499,782 |
| [22] | Filed | Oct. 21, 1965 |
| [45] | Patented | Sept. 29, 1970 |
| [73] | Assignee | Bowles Engineering Corporation<br>Silver Springs, Maryland<br>a corporation of Maryland |

[54] DIGITAL COMPARATORS
6 Claims, 1 Drawing Fig.

| [52] | U.S. Cl. | 137/81.5 |
|---|---|---|
| [51] | Int. Cl. | F15c 1/12 |
| [50] | Field of Search | 137/81.5 |

[56] References Cited
UNITED STATES PATENTS

| 3,232,533 | 2/1966 | Boothe | 137/81.5 |
|---|---|---|---|
| 3,238,959 | 3/1966 | Bowles | 137/81.5 |
| 3,246,661 | 4/1966 | Bauer | 137/81.5 |
| 3,266,507 | 8/1966 | Groeber et al. | 137/81.5 |
| 3,277,915 | 10/1966 | Dockery | 137/81.5 |
| 3,323,532 | 6/1967 | Campagnuolo | 137/81.5 |
| 3,331,382 | 7/1967 | Horton | 137/81.5 |
| 3,272,214 | 9/1966 | Warren | 137/81.5 |
| 3,340,885 | 9/1967 | Bauer | 137/81.5 |
| 3,369,557 | 2/1968 | Wood | 137/81.5 |

*Primary Examiner*—William R. Cline
*Attorney*—Hurvitz and Rose

ABSTRACT: A pure fluid digital comparator compares two binary fluid signals A and B and provides four distinct fluid output signals corresponding respectively to the following logic conditions:

(1) $A \cdot \bar{B}$, (2) $\bar{A} \cdot B$, (3) $A = B$, (4) $A \neq B$

The A and B signals are applied at separate input ports aligned with respective output ports to provide signals (1) and (2) respectively. The input ports are disposed so that coincidence of signals A and B provides an output signal at a further output port. A pair of channels are provided to conduct signals (1) and (2) to respective control nozzles of an OR/NOR gate. The OR output signal of the gate corresponds to signal (4) and the NOR output signal of the gate corresponds to signal (3).

Patented Sept. 29, 1970
3,530,869
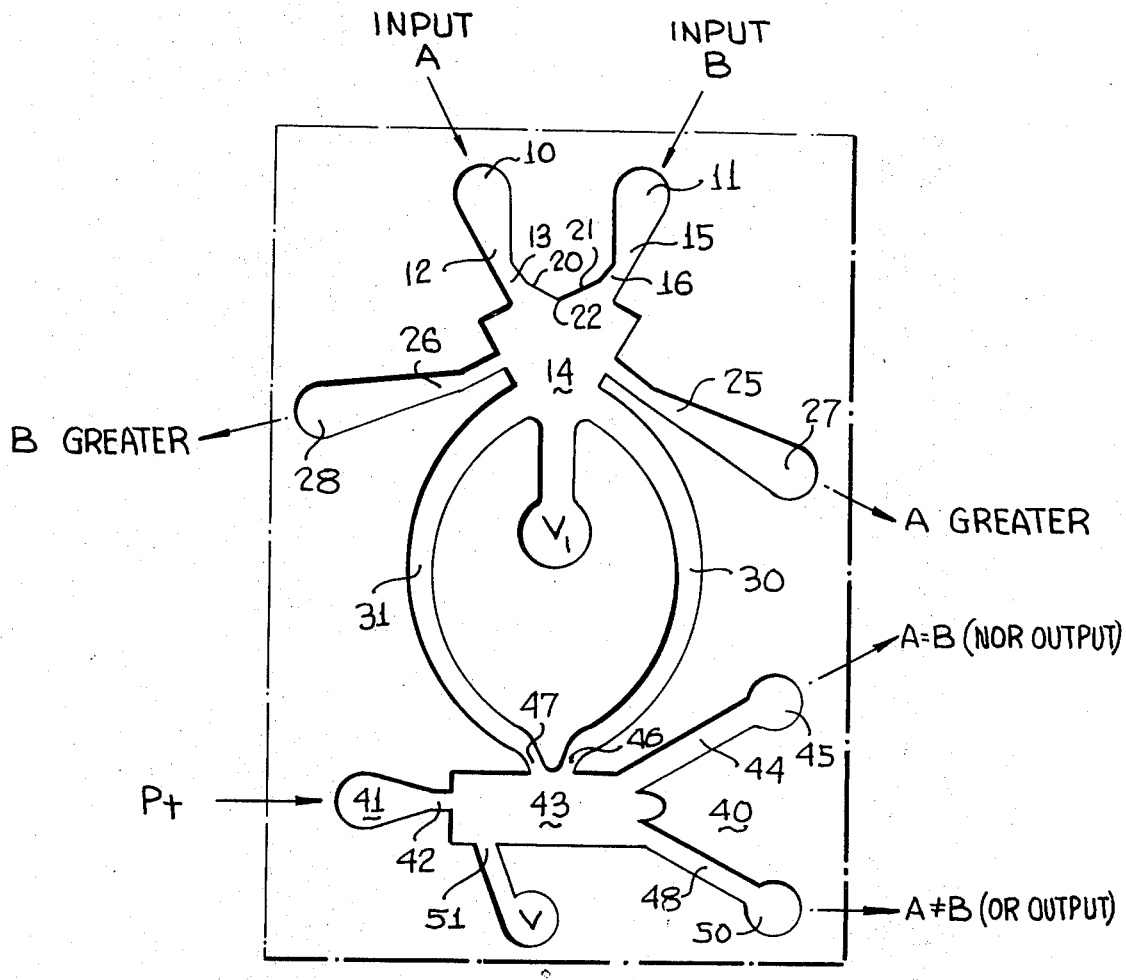
INVENTOR
CARMINE V. DiCAMILLO
BY Hurvitz & Rose
ATTORNEYS

DIGITAL COMPARATORS

The present invention relates generally to pure fluid logic circuitry and more particularly to digital comparators capable of indicating, in respect to two signals, whether either or both are present, and if one only is present, which one.

Briefly describing the present invention, two signals, denominated A and B, may be applied to separate input ports. Should either signal alone be present, flow through of that signal occurs to an output port peculiar to it, which signals presence of that signal alone. Should both signals A and B be simultaneously present they interact by momentum interchange to provide flow to a sump. A pure fluid amplifier is provided, having two control nozzles and two output channels, to a first of which the main power jet of the amplifier is normally directed. Presence of signal at either control nozzle, directs the main power jet to the alternate or second output channel. Should both signals A and B be simutaneously present no control signal is available, since the signals interact so as to flow to sump. Should either A or B be alone present, fluid is directed to one of the control jets of the amplifier, which in turn establishes flow from the second output channel of the pure fluid amplifier, indicating that A or B is available but not both.

In logical terminology, accordingly, the present system indicates as to two digital signals A and B, $A > B$ $B > A$ $A = B$ (NOR output)

$A \neq B$ (OR output)

It is, accordingly, an object of the invention to provide, in response to a pair of signals, an indication of which of the two is present, if one alone is present, and also to indicate whether both are present, or that only one is present.

The above and still further objects, features and advantages of the present invention will become apparent upon consideration of the following detailed description of one specific embodiment thereof, especially when taken in conjunction with the accompanying drawing, wherein:

The single figure of the drawing is a plan view of a full digital comparator according to the invention.

Referring now to the drawing, a first digital signal A, may be applied to an input port 10, and a second digital signal B to an input port 11. Either or both signals may occur at any given instant of time.

Port 10 proceeds via channel 12 to a nozzle 13, and the latter directs a jet of fluid into an interaction region 14. Port 11 likewise proceeds via a channel 15 to a nozzle 16, and the latter directs a jet of fluid into the interaction region 14. One side of the interaction region 14 includes gently sloping walls 20, 21, which intersect at 22, and which are capable of entraining the jets provided by nozzles 13 and 16 by boundary layer effect. Should both jets occur simultaneously, they intersect and hence interact near point of intersection 22, and by momentum interchange, follow a joint path into a channel 22, terminating in a sump $V_1$.

Should either A or B occur alone, the resulting jets flow into channels 25, 26 respectively. These channels 25, 26 terminate in output ports 27, 28 and presence of fluid flow from one of the latter indicates presence of a signal at one only of the signal input ports 10, 11, and identifies that input port. However, fluid overflow occurs into channels 30, 31, from the nozzles 15, 16, respectively, because the entrances to channels 30, 31 are adjacent to the entrances to channels 25, 26.

A pure fluid amplifier 40 is provided, having a power input port 41. The latter is connected to a nozzle 42 which ejects a fluid jet through an interaction region 43, and normally into a passage 44 which leads to an output port 45. Should both A and B be simultaneously present, the total flow of jets from nozzles 13, 16 occurs into sump $V_1$, and no flow occurs into passages 30, 31. Passage 30 terminates in a control nozzle 46, which feeds control fluid into interaction chamber 43. Likewise passage 31 terminates in a control nozzle 47, which feeds control fluid into interaction chamber 43. Either control nozzle 46, 47 deflects the jet issuing from nozzle 42, into a passage 48, terminating in an output port 50. A vented control nozzle 51 exists, opposed to nozzles 46, 47.

In operation, the jet from nozzle 42 issues into channel 44, unless deflected. Presence of both signals A and B provides no control fluid into passages 30, 31, since both signals interact to produce flow into sump $V_1$. Accordingly flow occurs to port 45, indicating that A=B, a NOR output. The same result would accrue if neither A nor B were present.

If A or B alone is present, signal flows to ports 27 or 28, and also via channels 30 or 31, to one of control nozzles 46, 47. Deflection of the jet from nozzle 42 then occurs, into channel 48, and flow from port 50 indicates $A \neq B$ an OR output. Ports 27, 28 then indicate whether A>B or B>A.

The jet issuing from nozzle 42, normally, or in absence of control signal, returns to channel 44, so that amplifier 40 can be characterized as mono-stable.

While I have described and illustrated one specific embodiment of my invention, it will be clear that variation of the details of construction which are specifically illustrated and described may be resorted to without departing from the true spirit and scope of the invention as defined in the appended claims.

I claim:

1. A pure fluid comparator, comprising:
   an input channel for a binary A signal;
   an input channel for a binary B signal;
   said binary A and B signals, when present, having substantially the same magnitude;
   said channels terminating in an interaction region;
   an output channel for said A signal alone communicating with said interaction region;
   an output channel for said B signal alone communicating with said interaction region;
   an output channel having an entrance equally facing both said input channels and arranged to collect only the sum of both signal A and B;
   a pure fluid amplifier including means directing a jet of fluid normally toward a NOR output channel;
   control channel means for deflecting said jet of fluid to an OR output channel; and
   means independent of said output channels for said A and B signals and responsive to presence of either but not both of said binary A and B signals at their respective input channels for activating said control channel.

2. A pure fluid comparator comprising:
   first and second input channels for respective first and second input signals terminating in an interaction region;
   first and second output channels communicating with said interaction region and disposed to receive said first and second input signals respectively when said input signals are present exclusive of one another;
   a first fluid passage disposed to receive a portion of said first input signal whenever said first output channel receives fluid;
   a second fluid passage disposed to receive portion of said second input signal whenever said second output channel receives fluid; and
   pure fluid logic means for providing a first output signal in response to fluid in either of said first and second fluid passages and for providing a second output signal in response to the absence of fluid in both said first and second fluid passages.

3. The combination according to claim 12 further comprising a third output channel communicating with said interaction region and disposed to receive fluid whenever said first and second input signals are present and substantially equal.

4. A pure fluid digital comparator for comparing two binary fluid signals A and B, said signals A and B each having a first binary pressure level and a second binary pressure level which is lower than said first binary pressure level, said comparator comprising:
first pure fluid input means for receiving binary signal A;
second pure fluid input means for receiving binary signal B;
first pure fluid means responsive to said signals A and B for providing a first positive pressure output signal when A>B in terms of pressure and a second positive pressure output signal when B>A in terms of pressure; and
second pure fluid means responsive to said signals A and B and independent of said first pure fluid means and said first and second output signals for providing a third positive pressure output signal whenever A=B in terms of pressure and a fourth positive pressure output signal whenever A ≠ B in terms of pressure.

5. The combination according to claim 4 wherein said second pure fluid means are included in a pure fluid amplifier.

6. The pure fluid digital comparator according to claim 4 further comprising means independent of said second pure fluid means for providing an indication representing the AND function for signals A and B.